United States Patent [19]

Furukawa

[11] Patent Number: 4,597,372
[45] Date of Patent: Jul. 1, 1986

[54] OIL SEPARATOR FOR BLOWBY GAS

[75] Inventor: Yasuharu Furukawa, Toyota, Japan

[73] Assignee: Toyota Jidosha Kabushiki Kaisha, Aichi, Japan

[21] Appl. No.: 753,602

[22] Filed: Jul. 10, 1985

[30] Foreign Application Priority Data

Sep. 26, 1984 [JP] Japan .................. 59-199395

[51] Int. Cl.$^4$ ............................................. F02M 25/06
[52] U.S. Cl. .................................. 123/572; 123/573; 123/574
[58] Field of Search ............. 123/573, 572, 574, 41.86

[56] References Cited

U.S. PATENT DOCUMENTS 4,528,969 7/1985 Senga ................................. 123/572
4,541,399 9/1985 Tanaka ............................... 123/573

FOREIGN PATENT DOCUMENTS 58-79009 5/1983 Japan .

Primary Examiner—Ronald H. Lazarus
Attorney, Agent, or Firm—Parkhurst & Oliff

[57] ABSTRACT

The invention relates to an oil separator for blowby gas having a baffle with a side wall and a bottom wall. A cut piece is bent from the bottom wall. A shut-off member is attached to the side wall and has a first wall located at a spaced distance from and opposed to the bottom end of the cut piece. The bottom end of the first wall is located between a first line extending from the bottom end of the cut piece and perpendicular to the first wall, and an intersection point defined at the intersection of an extension of the cut piece and an extension of the first wall. According to the inventive structure, the oil drops splashed by the rotating cam and reflected from a side wall of a cylinder head cover toward the baffle are effectively prevented from entering the baffle.

10 Claims, 9 Drawing Figures

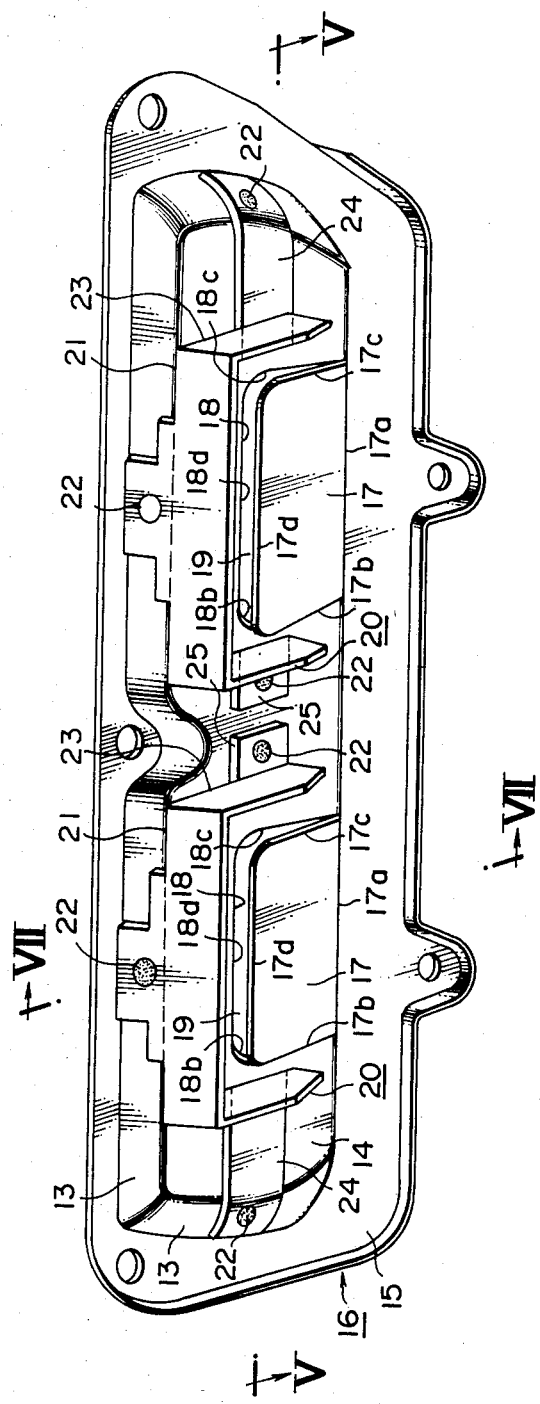

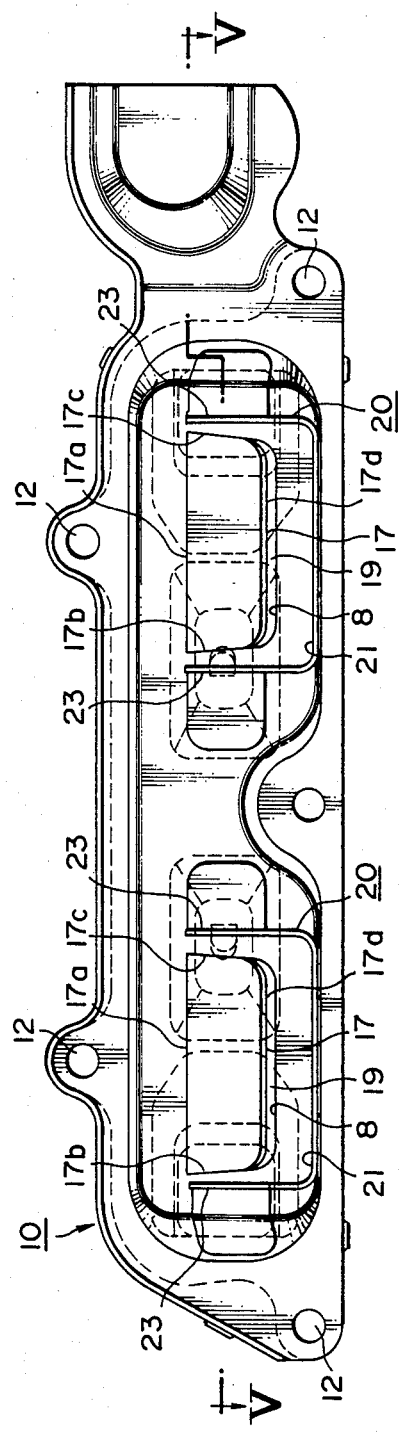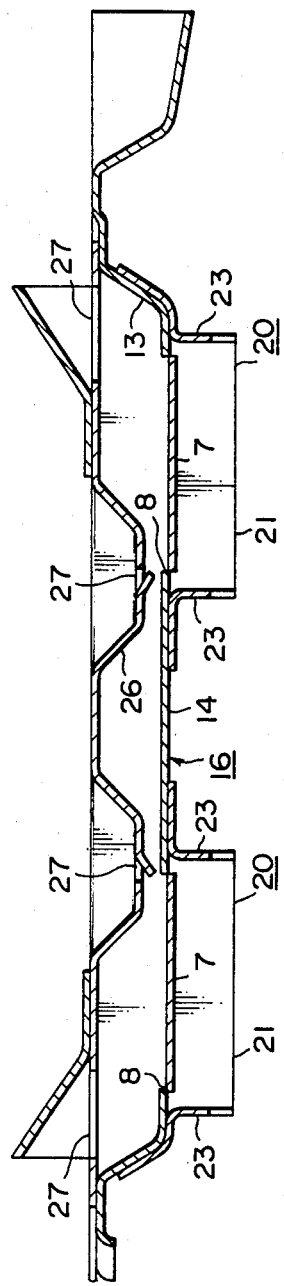

OIL SEPARATOR FOR BLOWBY GAS

BACKGROUND OF THE INVENTION

1. Field of the Invention

The present invention relates to an oil separator for blowby gas which is fitted inside of a cylinder head cover of an internal combustion engine to prevent oil splashed by a rotating cam, or oil hitting and reflecting from the side wall of the cylinder head cover, from being sucked into the baffle.

2. Description of the Prior Art

A baffle for installation in an internal combustion engine at the blowby gas exhaust port of a cylinder head cover to separate oil mist or drops from the blowby gas is known from Japanese Utility Model Publication SHO 58-79009.

In the baffle disclosed in Utility Model Publication SHO 58-79009, the baffle includes a side wall and a bottom wall which extends substantially in the horizontal direction from the bottom end of the side wall. A cut piece is cut from the bottom wall and is bent to slant downward therefrom. The blowby gas is sucked into the baffle through a hole opened in the bottom wall by bending the cut piece away from the bottom wall. The cut piece serves to prevent the oil splashed by a rotating cam from flying into the hole.

In the baffle constructed as described above, the cut piece can prevent the oil splashed by the cam from flying straight into the hole opened in the bottom wall, but it cannot prevent the oil reflected from the side wall of the cylinder head cover from flowing into the hole. Thus, a considerable volume of the oil goes into the baffle, thereby deteriorating the effect of the oil being separated from the blowby gas.

SUMMARY OF THE INVENTION

The object of the present invention is to provide an oil separator for the blowby gas that prevents oil drops splashed by a rotating cam and reflected from the side wall of the cylinder head cover from entering the baffle, thereby improving the effect of the oil being separated from the blowby gas.

In a preferred embodiment, the above-mentioned object is accomplished by an oil separator for blowby gas having a baffle which has a side wall and a bottom wall which extends substantially in the horizontal direction from the bottom edge of the side wall. A cut piece is bent away from the bottom wall to form a hole, a first cut of the cut piece continuing to the bottom wall and the second side opposite to the first side slanting downward toward a side wall of a cylinder head cover which is hit by oil splashed by a rotating cam. A gap is formed between a periphery of the hole opened in the bottom wall of the baffle when the cut piece is bent therefrom and the edge of the cut piece, the gap constituting a blowby gas suction port. An oil shut-off memeber is attached to the baffle, and has a first wall located at a spaced distance from and opposed to the other side of the cut piece. The bottom edge of the first wall is located between a first line extending from the bottom end of the cut piece and perpendicular to the first wall, and an intersection point defined at the intersection of an extension of the cut piece and an extension of the first wall.

The bottom wall of the baffle is desirably equipped with a lid extending horizontally between the edge of the hole opened by bending the cut piece and the bottom edge of the side wall of the baffle.

In addition, the first wall of the oil shut-off member desirably extends in the vertical direction in close contact with the outside surface of the side wall of the baffle.

Further, the oil shut-off member desirably has a pair of second walls extending parallel to a pair of connecting sides of the cut piece. Each second wall has a first end connected to the first wall and a second end opposite the first end. At the first end, the bottom edge of the second walls desirably extends to the same level as the bottom edge of first wall.

Further, at the second end, the bottom edge of the second walls of the oil shut-off member is desirably cut away so that it does not interfere with a rotating cam.

Between the second walls of the oil shut-off member and the pair of connecting sides of the cut piece there is desirably provided a space through which the blowby gas flows.

Further, the oil shut-off member is desirably spot-welded to the baffle.

The baffles desirably match the cams corresponding to the two central cylinders in a multi-cylinder engine.

A hole in the bottom wall of the baffle is provided for each of the two central cylinders and the oil shut-off member is provided for each hole.

In an oil separator for the blowby gas thus constructed, oil drops splashed by a rotating cam and reflected from the side wall of the cylinder head cover hit the first wall of the oil shut-off member as they fly toward the hole in the bottom wall of the baffle and thus are prevented from being sucked into the hole.

In addition, oil drops splashed by a rotating cam and flying straight toward the hole in the bottom wall of the baffle hit the cut piece of the baffle and thus are prevented from being sucked into the hole.

In this manner, suction of oil drops into the baffle can be effectively prevented, thereby enhancing the effect of the oil separation from the blowby gas.

BRIEF DESCRIPTION OF THE DRAWINGS

The above and other objects, features and advantages of the invention will become apparent and more readily appreciated from the following detailed description of a preferred exemplary embodiment of the invention, taken in conjunction with the accompanying drawings, in which:

FIG. 3 is a perspective view of the oil separator in the engine shown in FIG. 1;

FIG. 4 is a bottom view of the oil separator in FIG. 3;

FIG. 5 is a sectional view of the oil separator taken along line V—V in FIG. 3;

DETAILED DESCRIPTION OF THE PREFERRED EMBODIMENT

Figure 1:
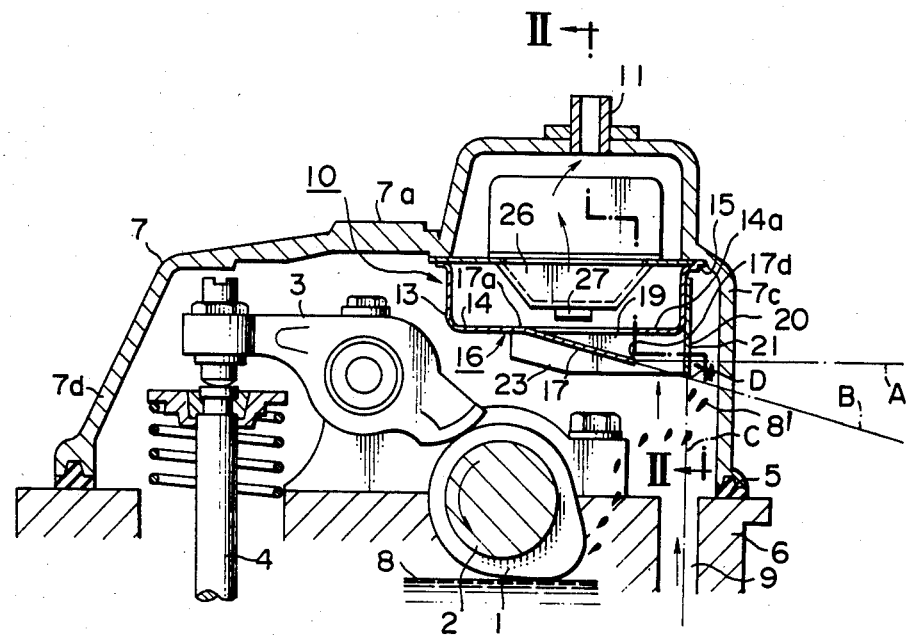
FIG. 1 is a cross-sectional view of an engine equipped with an oil separator for blowby gas in accordance with one embodiment of the present invention.

A preferred embodiment of the present invention is described herein with reference to the attached drawings.

The cylinder head of the engine holds a movable valve system comprising a cam shaft 2 with a cam 1, a rocker arm 3 and an intake/exhaust valve 4. These items are covered with a cylinder head cover 7 which is fitted to the cylinder head 6 via the seal member 5.

The top side of the cylinder head 6 collects the lubricating oil 8 and the oil splashed by the rotation of the cam 1. The space above the surface of the oil 8 provides a path through which flows the blowby gas (i.e., the gas which has blown by is intended destination) blown up from the blowby gas passage 9 formed in the cylinder head 6. Oil mist and oil drops splashed by the rotation of the cam 1 are blended in the blowby gas. The blowby gas from which the oil has been removed by the oil separator 10, exits through the blowby gas exit 11 formed in the cylinder head cover 7 and returns to the intake system of the engine.

The cylinder head cover 7 has a top wall 7a and a side wall 7d. A part 7c of the side wall 7d on which oil drops 8' are splashed by the rotation of the cam 1 extends substantially in the vertical direction. The cylinder head cover 7 is ordinarily a casting of Al alloy. The oil separator 10 is fixed to the top wall 7a of the cylinder head cover 7 by means of rivets 12 or welding.

In the case of a 4-cylinder engine, an oil separator 10 is provided for the two central cylinders and extends in the same direction as the cam shaft 2, that is, in the longitudinal direction of the engine. Since the blowby gas space extends in the longitudinal direction of the engine, the blowby gas after flowing through the space above the two extreme cylinders in a 4-cylinder engine flows via the blowby gas space in the two central cylinders into the oil separator, where the oil is separated. The blowby gas then flows through the blowby gas exit 11.

The oil separator 10 is equipped with a baffle 16 which has a side wall 13 extending substantially downward, a bottom wall 14 continuing from the bottom end of the side wall 13 and extending substantially in the horizontal direction, and a flange 15 extending outward from the top wall 7a of the cylinder head cover. The baffle 16 is fixed at the flange 15 to the top wall 7a of the cylinder head cover by means of rivet 12 or welding. The side wall 13 has an outside surface adjacent the side wall 7c of the cylinder head cover.

In the bottom wall 14 of the baffle 16, a cut piece 17 is formed by binding or punching out a part of the bottom wall 14. A hole 18 is opened at the bent part of the cut piece. The cut piece 17 and the hole 18 are approximately rectangular in shape. The cut has three sides 17b, 17c and 17d separated from the bottom wall 14 and has only one side 17a connected to the bottom wall 14. The edges of the hole 18 corresponding to the three sides 17b, 17c and 17d of the cut piece 17 are designated respectively as 18b, 18c and 18d. The first side 17a of the cut piece connected to the bottom wall 14 of the baffle, as compared with lateral sides 17b, 17c and a second side 17d, is located farthest from the side wall 7c, which is hit by the oil splashed by the rotation of the cam 1. The cut piece 17 slants downward from the first side 17a which continues into the bottom wall 14 of the baffle. The cut piece 17 also extends to a second side 17d which is opposed to the first side 17a. Therefore, a gap is formed between the second side 17d of the cut piece and the edge 18d of the hole, between the lateral side 17b of the cut piece and the edge 18d of the hole, and between the lateral side 17c of the cut piece and the edge 18c of the hole, each gap providing a blowby gas suction port 19 through which the blowby gas flows into the baffle 16.

On the bottom wall 14 of the baffle 16, there is a lip 14a extending horizontally between the edge 18d of the hole 18 (corresponding the second side 17d of the cut piece), and the bottom edge of the side wall 13 which is opposed to the second side 17d of the cut piece 17.

The baffle 16 is attached to an oil shut-off member 20. The oil shut-off member 20 has a first wall 21 extending substantially in vertical direction at a spaced distance from and opposed to the second side 17d of the cut piece.

Figure 7:
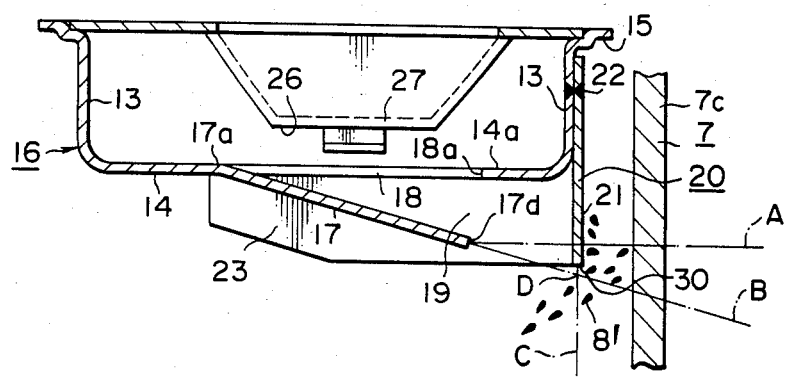
FIG. 7 is a sectional view of the oil separator taken along line VII—VII in FIG. 3 and operating in accordance with the principles of the present invention.

The bottom edge 30 of the first wall 21 is located between a line extending from the bottom edge of the cut piece, i.e., the second side 17d, and perpendicular to the first wall 21 (line A FIG. 1 or FIG. 7), and an intersection point D at the intersection of an extension of the first wall 21 (line C in FIG. 1 or FIG. 7) and an extension of the cut piece 17 (line B in FIG. 1 or FIG. 7). The space between the bottom edge 30 of the first wall 21 and the second side 17d of the cut piece 17 is the blowby gas suction port. The first wall 21 extends substantially in the vertical direction with its mid-width portion in close contact with the outside surface of the side wall 13 of the baffle. The first wall 21 is fixed to the baffle 16 by spot welding at its part in close contact with the side wall 13 of the baffle.

The oil shut-off member 20 has a pair of second walls 23, 23 which extend parallel to the pair of lateral sides 17b, 17c of the cut piece. The second walls 23, 23 each have a first end orthgonally connected to the first wall 21. The first ends of the second walls 23, 23 have lower edges which extend to the same level as the bottom edge 30 of the first wall 21. The second end of the second walls 23, 23 are opposed to the first end, and have lower edges which are obliquely cut away so that they do not hinder the rotation of the cam 1.

Between the second walls 23, 23 and the lateral sides 17b, 17c of the cut piece, there is provided a gap through which the blowby gas can flow. Thus, the gap constitutes the blowby gas suction port.

The oil shut-off members 20, 20 match the holes 18, 18 in each baffle 16, and therefore, there are two oil shut-off members in a 4-cylinder engine. The oil shut-off member is equipped with two arms 24, 25 which extend from the second walls 23, 23 in the longitudinal direction of the engine. One arm 24 is bent to closely fit the side wall 13 of the baffle from the bottom wall 14 of the baffle, and is immovably spot welded to the side wall 13 of the baffle. The other arm 25, extends along the bottom wall 14 of the baffle, and is immovably spot welded to the bottom wall 14 of the baffle. The reference numeral 22 indicates a spot-welded.

The baffle 16 internally holds an oil-separating plate 26, which together with the baffle 16, is fixed to the top wall 17a of the cylinder head cover. The oil-separating plate 26 comprises a corrugated pressed board or another plate fitted to such a board, which has a central hole 27. When the blowby gas passes through this hole 27, the oil can be separated from the gas due to a difference in an oil-gas passing velocity. That is, the gas passes through the baffle at a greater velocity than the oil, thus causing the oil to separate from the gas.

Next, the process of oil-gas separation in a device designated as described above will be explained. The blowby gas flowing through the blowby gas passage in the cylinder head cover 7 contains much of the oil mist produced by the crank shaft in the crank case and much of the oil mist produced by the rotation of the cam 1 inside of the cylinder head cover 7. Moreover, oil drops are splashed within the blowby gas passage by rotation of the cam 1. The oil mist which is entrained with the blowby gas is removed as it hits the cut piece 17, the baffle 16 and the oil-separating plate 26. On the other hand, as the blowby gas passes through the gap between the cut piece 17 and the hole 18 in the bottom 14 of the baffle and through the hole 27 in the oil-separating plate 26, oil-gas separation takes place on account of a difference in the flowing velocity of oil and gas. Thus, the separated oil falls onto the surface of the oil 8 on the cylinder head 6.

Oil drops splashed by the rotation of the cam 1 impinge mainly on the side wall 7c of the cylinder head cover 7. Some of the oil drops fall down but others, being reflected, fly into the blowby gas suction port installed between the cut piece 17 of the baffle 16 and the periphery of the hole 18. However, since the first wall 21 of the oil shut-off member 20 is installed on the side of the side wall 7c of the cylinder head cover 7 of the blowby gas suction port, the oil drops flying toward the blowby gas suction port will hit the first wall 21 and thus will not go inside the baffle 16 as shown in FIG. 7.

Figure 8:
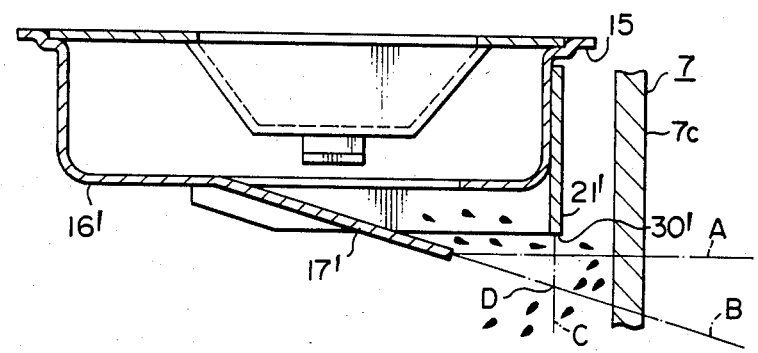
FIG. 8 is a sectional view of the oil separator illustrating operation of the separator when a bottom edge of a separator wall is located above a range specified by the present invention.

The position of the bottom edge 30 of the first wall 21 permits the oil shut-off member 20 to prevent effectively the invasion of the oil drops. For example, if the bottom edge 30' of the first wall 21' is located as illustrated in FIG. 8 above the bottom edge of the cut piece 17' (line A in FIG. 8), then the oil drops in flight toward the blowby gas suction port after reflection from the side wall 7c of the cylinder head cover 7 would easily flow to the inside the baffle 16' with a reduced effect of oil separation.

Figure 9:
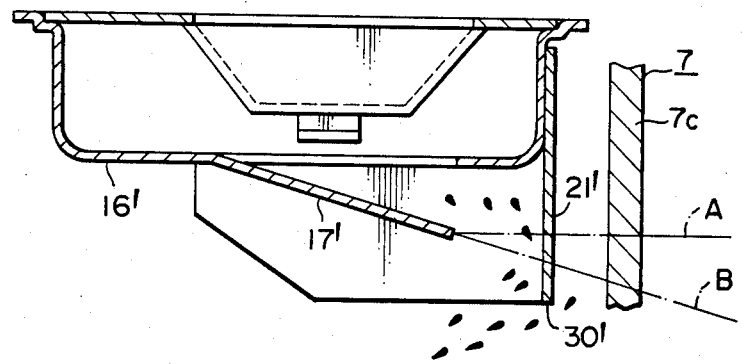
FIG. 9 is a sectional view of the oil separator illustrating operation of the separator when a bottom edge of a separator wall is located below a range specified by the present invention.

Alternatively, if the bottom edge 30' of the first wall 21' is located as illustrated in FIG. 9 below the intersection of an extension of the cut piece 17' with an extension of the first wall 21' (i.e., below line B), then the oil drops splashed by the rotation of the cam 1 would directly hit the first wall 21' and, being reflected thereby, would flow to the inside of the baffle 16'. In other words, the first wall 21' would play the same role played by the side wall 7c of the cylinder head cover.

However, if the bottom end 30 of the first wall 21 is located as in FIG. 7 between a first line A extending from the bottom end of the cut piece and perpendicular to the first wall 21, and an intersection point D located at the intersection of an extension of the first wall 21 (line C) and an extension of the cut piece (line B), then oil deflecting off the head cover 7 will be blocked from entering the baffle by the first wall 21. That is, the first wall 21 will prevent oil from entering the baffle by forming a blockade against invasion of deflected oil drops.

Figure 2:
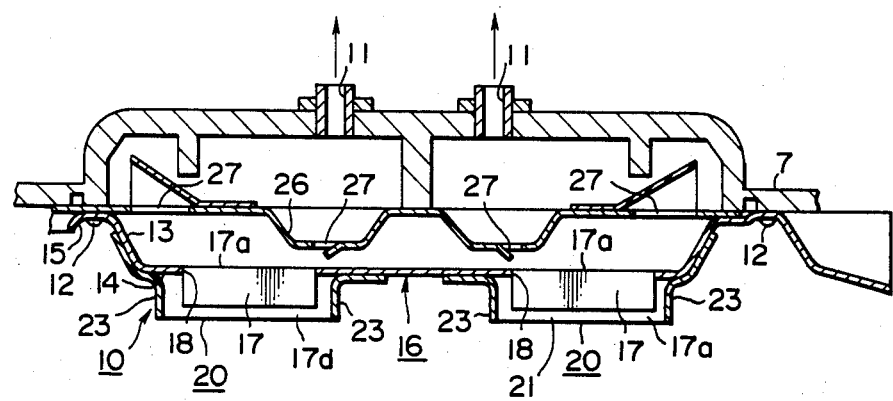
FIG. 2 is a longitudinal sectional view of the engine in FIG. 1 taken along the line II—II of FIG. 1.
Figure 6:
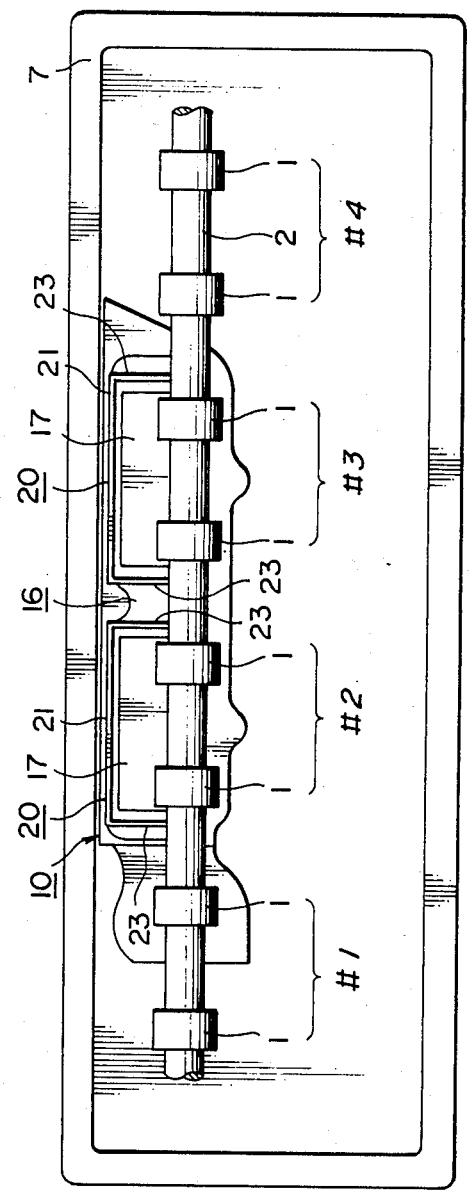
FIG. 6 is a plan view showing the oil separator in FIG. 3 as installed in a 4-cylinder engine.

In FIG. 2, a considerable number of oil drops will also fly around the first wall 21 too, but here again the second wall 23, whose bottom end is set at the same level as the bottom end of the first wall 21, will act the same as the first wall 21 and inhibit the invasion of oil drops into the baffle 16. In addition, the lip 14 inhibits the entry of oil into the baffle.

The second ends of the second walls 23, 23, have been obliquely cut away so that they will not hinder the rotation of the cam 1. Oil drops splashed upward from the oil surface by the rotation of the cam 1 will be prevented from direct invasion into the baffle 16 by the cut piece 17 and the lip 14a.

In this manner, invasion of oil drops into the baffle 16 can be effectively prevented.

In the example illustrated above, the oil separator 10 is installed only at positions matching the two central cylinders of the multi-cylinder engine. Preferably, a separator is provided for each hole in the baffle. Under such an arrangement of the oil separators, there will be no increase in oil invasion into the baffle 16 in a transverse engine (i.e., an engine which is disposed in a vehicle so that the longitudinal direction of the engine is transverse to the running direction of the vehicle).

When the vehicle turns and the oil surface on the cylinder head is inclined, the cam 1 at the positions corresponding to the engine extremes will splash large volumes of oil, because an oil separator is not installed at those extreme positions. This case is not limited to a 4-cylinder engine. However, in the case of an engine with more than 4 cylinders, the oil separators have only to be installed at a position corresponding to the central cylinders for the same effect as that obtained by the present invention.

As can be seen from the above account of the invention, the oil separator for blowby gas according to the present invention yields such an effect that the oil shut-off member installed in the baffle can prevent oil drops from invading the baffle and the oil can be separated from the blowby gas.

Although only a preferred embodiment of the present invention has been described in detail, it will be appreciated by those skilled in the art that various modifications and alterations can be made to the particular embodiments shown without materially departing from the novel teaching and advantages of this invention. Accordingly, it is to be understood that all such modifications and alterations are included within the scope of the invention as defined by the following claims.

What is claimed is:

1. An oil separator for blowby gas in a multi-cylinder internal combustion engine having rotating cams, the oil separator comprising:
   a baffle having a side wall and a bottom wall which extends from a lower edge of said side wall, a cut piece bent away from said bottom wall to form a hole in said bottom wall, said cut piece including one side connected to said bottom wall a slanting portion and an opposide side opposed to said one side and comprising an edge, said cut piece slanting toward a side wall of a cylinder head cover, a gap formed between a periphery of the hole formed in said bottom wall and the edge of said cut piece constituting a blowby gas suction port; and
   an oil shut-off member attached to said baffle and having a first wall located at a spaced distance from and opposed to said edge of the cut piece of said baffle, a bottom end of said first wall being located between a first line extending from said edge of said cut piece and perpendicular to said first wall, and an intersection of an extension of said cut piece and an extension of said first wall.

2. The oil separator for blowby gas of claim 1, wherein said baffle is located above said cylinders, and said bottom wall slants downward toward said cylinders.

3. The oil separator for blowby gas of claim 1, wherein the bottom wall of said baffle includes a lip extending between the periphery of the hole opposed to said edge of said cut piece, and the bottom end of the side wall.

4. The oil separator for blowby gas of claim 1, wherein said first wall of said oil shut-off member extends downward substantially in the vertical direction, said first wall being secured to a surface of the side wall of the baffle facing the side wall of the cylinder head cover.

5. The oil separator for blowby gas of claim 1 wherein said cut piece has a pair of lateral connecting sides which connect said one side and said edge of said cut piece, and said oil shut-off member has a pair of second walls generally parallel to said lateral sides of said cut piece, each of said second walls having a first end connected to said first wall, bottom ends of said second walls extending to the same level as the bottom end of said first wall at the first end of the second walls.

6. The oil separator for blowby gas of claim 4, wherein each second wall has a second end opposite the first end, each second end of said second wall being cut away to prevent interference with a rotating cam.

7. The oil separator for blowby gas of claim 5, wherein a gap is provided between said second walls of said oil shut-off member and said connecting sides of said cut piece, the blowby gas flowing through said gap.

8. The oil separator for blowby gas of claim 1, wherein said oil shut-off member is fixed to said baffle by spotwelds.

9. The oil separator for blowby gas of claim 1, wherein baffles are provided for the cams for the two central cylinders in a multi-cylinder engine.

10. The oil separator for blowby gas of claim 9, wherein holes are provided in the bottom wall of said baffle corresponding to said two central cylinders and an oil shut-off member is provided corresponding to each of said holes in the bottom wall of said baffle.

* * * * *